(12) United States Patent
Okuyama

(10) Patent No.: US 8,149,898 B2
(45) Date of Patent: Apr. 3, 2012

(54) MOBILE COMMUNICATION SYSTEM RECEIVER, PATH TRACKING METHOD, AND CONTROL PROGRAM THEREOF

(75) Inventor: Toshiyuki Okuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 750 days.

(21) Appl. No.: 12/280,284

(22) PCT Filed: Feb. 27, 2007

(86) PCT No.: PCT/JP2007/053623
§ 371 (c)(1),
(2), (4) Date: Aug. 21, 2008

(87) PCT Pub. No.: WO2007/099943
PCT Pub. Date: Sep. 7, 2007

(65) Prior Publication Data
US 2010/0232477 A1 Sep. 16, 2010

(30) Foreign Application Priority Data
Feb. 28, 2006 (JP) .................................. 2006-053582

(51) Int. Cl.
*H04B 1/00* (2006.01)
(52) U.S. Cl. ......................................................... 375/148
(58) Field of Classification Search .................. 375/148, 375/144, 145, 147, 150, 152; 370/342; 455/101
See application file for complete search history.

(56) References Cited

U.S. PATENT DOCUMENTS

| 7,072,383 | B2 | 7/2006 | Saito et al. |
| 2001/0014116 | A1 | 8/2001 | Saito et al. |
| 2002/0006158 | A1 | 1/2002 | Schmidl et al. |
| 2003/0026233 | A1* | 2/2003 | Ohsuge .......................... 370/342 |
| 2003/0039304 | A1* | 2/2003 | Terao .............................. 375/148 |
| 2004/0253934 | A1* | 12/2004 | Ryu et al. ....................... 455/101 |
| 2005/0094710 | A1* | 5/2005 | Ko et al. ......................... 375/145 |
| 2005/0111526 | A1 | 5/2005 | Bilgic et al. |

FOREIGN PATENT DOCUMENTS

| EP | 1126627 A | 8/2001 |
| EP | 1134908 A | 9/2001 |
| JP | 2001223613 A | 8/2001 |
| JP | 2001313590 A | 11/2001 |
| JP | 2001352276 A | 12/2001 |
| JP | 2005064593 A | 3/2005 |

OTHER PUBLICATIONS

International Search Report for PCT/JP2007/053623 mailed Apr. 10, 2007.
Supplementary European Search Report for EP 07 73 7425 issued Jan. 5, 2012.

* cited by examiner

*Primary Examiner* — Chieh M Fan
*Assistant Examiner* — Shawkat M Ali

(57) ABSTRACT

To prevent disabling of the path tracking function.

A path allocation unit allocates a signal power peak of a delay profile crated by a delay profile creation unit as a path to a finger reception unit. When tracking a path which has been allocated by the path allocation unit, it is judged whether a path tracking region set for each path is overlapped with a mask region. The path is tracked by performing a process not to cause a loss of a path tracking function due to overlap. Demodulation of the path which has been allocated is performed by a finger reception unit. Each of the demodulated signals outputted from the finger reception unit are rake combined to reproduce the transmitted information signal.

25 Claims, 12 Drawing Sheets

-- PRIOR ART --

-- PRIOR ART --

-- PRIOR ART --

MOBILE COMMUNICATION SYSTEM RECEIVER, PATH TRACKING METHOD, AND CONTROL PROGRAM THEREOF

TECHNICAL FIELD

The present invention relates to a mobile communication system receiver, a path tracking method, and a control program thereof. More specifically, the present invention relates to a receiver in a mobile communication system having a fine multipath tracking function, and to a path tracking method as well as a control program thereof.

BACKGROUND ART

When trying to transmit an information bit string (data object) to a receiver side in a DS-CDMA mode (Direct Sequence Code Division Multiple Access) used in mobile communication, the information bit string is modulated into spread spectrum signals by spreading the string with spread codes, and the modulated signals in a form of radio signals are transmitted to the receiver side for achieving communication.

Chip rate of the spread codes used in the DS-CDMA mode is a sufficiently high rate for a signal rate of the information bit string, and it is selected as a sufficiently high rate for propagation delay time between a mobile terminal device and a base station.

Therefore, it becomes possible to separate the radio signals reached via a specific propagation path based on the propagation delay time from the multipath signals that reach a mobile terminal device (receiver) via different propagation paths generated due to indirect reflected waves, diffracted waves, or the like, i.e., via different propagation path lengths. Each of the separated DS-CDMA signals having different propagation delay time is referred to as a multipath signal. It is well-known that a path diversity effect can be obtained and receiver gain can be improved through performing demodulation by allocating respective finger receiver units to the separated multipath signals and performing rake combining of each demodulated signal.

Separation of the multipath signals described above is performed based on a delay profile that shows received signal power distribution for the propagation delay time (reaching time to the receiver). The delay profile can normally be obtained through calculating the code correlations with respect to the spread codes of receiving waves by using a matched filter or a sliding correlator by each chip rate or by each over-sampling rate that is an integral multiple of the chip rate. FIG. 10 shows an example where there are three paths in the delay profile. The horizontal axis in FIG. 10 represents relative propagation delay time, and the longitudinal axis represents signal powers. Reference numeral 301 in FIG. 10 indicates a noise level, and it is assumed that there exists an effective path when the signal power is at a peak position 302 for the noise level 301.

For such paths present in the delay profile, the aforementioned finger receiver is allocated and demodulation is performed. When the allocation is done once, there is taken a measure to prevent allocation of other finger receivers to the vicinity of the allocated path, i.e., there is taken a measure to set a mask region to the vicinity of the path to which the finger receiver is allocated so as to prevent allocation of other finger receivers to the path to which the mask region is set.

Reasons for taking the above-described preventing measure are as follows. That is, paths in the vicinity of the significant path in many cases are side lobes of that path, i.e., paths that are not independent of the allocated path. Thus, even if finger receivers are allocated to such paths and rake combine is performed thereon, the path diversity effect cannot be obtained. In addition, noise and interference components are superimposed on the demodulated signals, which may possibly result in deteriorating the reception qualities. Furthermore, limited resources of finger receivers are to be used wastefully.

In addition to setting the aforementioned mask regions, state of the propagation paths is constantly fluctuated in the mobile telecommunications, i.e., there is a fluctuation occurred in the delay profile constantly. In order to maintain a fine reception quality, the delay profile is updated periodically. If it becomes necessary as a result thereof, there is performed tracking processing for the path whose propagation delay is fluctuated, or there is performed update processing of the allocation of the finger receivers for emerging paths and fading paths. For that, as shown in FIG. 11, employed is a method which performs the path tracking processing and the update processing of path allocation to the finger receivers through setting a path tracking region 303 for searching fluctuation of signal power peak positions, and mask regions 304 for preventing allocation of other finger receivers to the vicinity of the path that has been allocated to a finger receiver on the delay profile.

Patent document 1 discloses a synchronous tracking method in a spread spectrum communication system having a path search function. A delay profile measuring device, an extracting device for extracting path timing signals from the delay profile, and a path identifying device for identifying a subordinate path group and an independent path are used for the path tracking operation. The path identifying device contains a threshold value setting device that is capable of setting a threshold value, and identifies each path with the path timing signal that has a value equals to or higher than the threshold value (e.g., each path with the path timing signals within ±1-chip time length) as a subordinate path group.

Patent Document 1: Japanese Unexamined Patent Publication 2001-313590

There are also following issues even if the aforementioned known method is employed. That is, in a case of the delay profile shown in FIG. 12, i.e., a delay profile where three paths 305, 306, and 307 are close to each other (a delay profile especially with a small difference in the propagation delay time), the side lobes in the vicinity of the signal power peaks of the three paths 305, 306, and 307 overlap with each other, and there are the mutually overlapped signal power peaks of the three paths 305, 306, and 307 present in the delay profile.

When the aforementioned path tracking regions and mask regions are set for the paths 305, 306, and 307 in the delay profile shown in FIG. 12, a part of the path tracking region set for a single path comes to lose the function as the path tracking region because of the mask region set for its neighboring path as shown in FIG. 12, since the path tracking regions and the mask regions set for each of the aforementioned three paths 305, 306, and 307 overlap with each other.

Therefore, path tracking operations cannot be done in the right direction for the path 305, in both directions for the path 306, and in the left direction for the path 307. When such incapability of path tracking operations occurs continuously in fluctuation of the delay profile, in particular, the reception quality becomes deteriorated. At last, it may result in disconnection of calls.

In Patent Document 1, for identifying whether the paths in the delay profile are subordinate path group or independent path, it is judged whether the paths are the subordinate group or not only depending on the presence of the path timing signals but no other factors are considered for grouping the paths. That is, it is not designed to perform grouping of the paths other than the aforementioned manner.

DISCLOSURE OF THE INVENTION

The present invention is designed in view of the foregoing circumstances, and it is an object of the present invention to provide a path tracking method and a receiver, which are used in spread spectrum communications for improving the path tracking performance for a plurality of multipaths.

In order to overcome the foregoing issues, a receiving mechanism in a mobile communication system according to the present invention includes: a path tracking processing function of detecting signal power peaks from a delay profile of multipath multiplexed signals received via a plurality of propagation paths, separating/extracting each path contained in the multipaths based on propagation delay of the detected signal power peaks, allocating finger receivers to the signals of each of the separated/extracted paths for performing demodulation as well as rake combine of each demodulated signal, updating the delay profile every prescribed time interval for tracking chronological changes of the propagation paths, when a signal power peak position within a path tracking region set in advance for each path is fluctuated, estimating that the path is fluctuated, and performing tracking of the fluctuated path; and a mask region setting function of setting mask regions for preventing other finger receivers than the reception finger receivers to the path from being allocated to the vicinity of the path when performing the path tracking processing, wherein, when the finger receivers are allocated to each of the paths of the multipaths in which each of the paths is close to each other in terms of time, each of the constituent paths is put into a group, priority orders are set for each of the constituent paths within the group for performing path tracking operations, and path tracking processing is performed according to the priority orders.

For the path tracking processing performed according to the priority orders, it is desirable to set the path tracking region and the mask regions for each path.

For the path tracking processing performed according to the priority orders, the path tracking region may be set for each path to perform a tracking operation of the path, and the mask regions may be set for the path after completing the tracking operation.

It is desirable for the grouping processing to be performed every time the tracking operation of a single path is performed. The grouping processing may also be performed when the tracking operations of all the assumed multipaths are completed.

Further, the grouping processing may also be performed to put each of the adjacent paths when "Td<2(Tt+Tm)" applies, provided that a propagation delay time difference of the adjacent paths is "Td", a half of time length of the path tracking region is "Tt", and time length of the mask region is "Tm".

Furthermore, the grouping processing may also be performed to put each of the adjacent paths into a group, when the propagation delay time difference of the adjacent paths is within prescribed time that is set in advance.

Further, the priority orders may be so set that the path having the maximum signal power within the group is given the highest priority, or may be set in order from the path having the higher signal power to the path having the lower signal power. The priority orders may be set in order of time at which separation/extraction of the paths is executed, or may be set in order of executing separation/extraction of the paths from the latest to the oldest.

After the path tracking operation is performed by setting the path tracking region and the mask regions for the most preferential allocated path among the paths under the priority order, the path tracking operations for the remaining paths may be executed by setting the path tracking regions and the mask regions for the paths uniformly. After performing the tracking operation of the path under the priority order by setting the path tracking region and the mask regions for the path according to the priority order and resetting the path tracking region and the mask regions to the path to which the tracking operation has been done, the path tracking regions and the mask regions may be set for the remaining paths to perform the path tracking operations.

A path tracking method of a mobile communication system according to the present invention, which: detects signal power peaks from a delay profile of multipath multiplexed signals received via a plurality of propagation paths; separates/extracts each path contained in the multipaths based on propagation delay of the detected signal power peaks; allocates finger receivers to the signals of each of the separated/extracted paths for performing demodulation as well as rake combine of each demodulated signal; updates the delay profile every prescribed time interval for tracking chronological changes of the propagation paths; when a signal power peak position within a path tracking region set in advance for each path is fluctuated, assumes that the path is fluctuated; and sets a path tracking region to the fluctuated path and sets mask regions for preventing other finger receivers than the finger receivers allocated to the path from being allocated to the vicinity of the path, wherein, when the finger receivers are allocated to each of the paths of the multipaths in which each of the paths is close to each other in terms of time, each of the constituent paths is put into a group, priority orders are set for each of the constituent paths within the group for performing path tracking operations, and path tracking processing is performed according to the priority orders.

The path tracking processing performed according to the priority orders may be executed by setting the path tracking region and the mask regions for each path. Alternatively, the path tracking region may be set for each path to perform the tracking operation of the path, and the mask regions may be set for the path after completing the tracking operation.

The path tracking processing may be executed after completing the tracking operations of all the assumed multipaths.

Further, the grouping processing may also be performed to put each of the adjacent paths when "Td<2(Tt+Tm)" applies, provided that a propagation delay time difference of the adjacent paths is "Td", a half of time length of the path tracking region is "Tt", and time length of the mask region is "Tm". The grouping processing may also be performed to put each of the adjacent paths into a group, when the propagation delay time difference of the adjacent paths is within prescribed time that is set in advance.

Further, the priority orders are so set that the path having the maximum signal power within the group is given the highest priority. The priority orders may be set in order from the path having the higher signal power to the path having the lower signal power. The priority orders may be set in order of time at which separation/extraction of the paths is executed, or may be set in order of executing separation/extraction of the paths from the latest to the oldest.

After the path tracking operation is performed by setting the path tracking region and the mask regions for the most preferential allocated path among the paths under the priority order, the path tracking operation for the remaining paths may be executed by setting the path tracking regions and the mask regions for the paths uniformly. After performing the tracking operation of the path under the priority order by setting the path tracking region and the mask regions for the path according to the priority order and resetting the path tracking region and the mask regions to the path to which the tracking operation has been done, the path tracking regions and the mask regions may be set for the remaining paths to perform the path tracking operations.

With the present invention, for performing the tracking operations of the paths fluctuated in accordance with chronological changes of the propagation paths at the time of receiving multipath multiplexed signals, when finger receivers are allocated to each of the paths of the multipaths close to each other in terms of time, the paths are put into a group, priority orders for performing the tracking operations are given to each path within the group, and path tracking processing is performed according to the priority orders. Therefore, the path tracking operations can be prevented from becoming incapable because of the mask regions, so that the reception qualities can be improved.

BEST MODES FOE CARRYING OUT THE INVENTION

Exemplary embodiments of the invention will be described hereinafter by referring to the accompanying drawings.

As a basic structure, a mobile communication system receiver according to the exemplary embodiment is a receiver which, based on a delay profile of multipath multiplexed signals to be received, separates/extracts each path contained in multipaths, demodulates received signals by each of the separated paths, and performs rake combine on the demodulated signals. The receiver separates/extracts each path contained in the multipaths and allocates demodulation finger receivers to the separated/extracted paths, and sets priority orders for paths in an adjacent path group having small propagation delay time separated/extracted from the multipaths to eliminate interference generated between adjacent paths according to the priority orders, and performs path tracking processing. Next, the exemplary embodiments will be described in details by using a specific example.

(First Exemplary Embodiment)

A case of applying the receiver of the mobile communication system according to the exemplary embodiments to a DS-CDMA mode receiver will be described as a first exemplary embodiment. As described above, a CDMA receiver 1 according to the first exemplary embodiment puts the paths of multipath multiplexed signals received via a plurality of propagation paths into a group when path tracking regions and mask regions set for those paths overlap with each other, gives priority orders to each path within the groups, and performs tracking operations of each path according to the priority orders. As shown in FIG. 1, the CDMA receiver 1 has a delay profile creation unit 12, a path allocation unit 14, a plurality of numbers of finger reception units 16, and a rake combine unit 18. Although not shown, the CDMA receiver has a radio reception unit and an A/D conversion unit. Base band digital signals that are digital signals converted from analog signals in the A/D conversion unit are inputted to the delay profile creation unit 12.

The radio reception unit down-converts received signals from a radio frequency and also converts those to base band analog (I/Q) signals by phase demodulation. The A/D conversion unit converts the base band analog signals to base band digital signals, and outputs the base band digital signals to the delay profile creation unit 12. The delay profile creation unit 12 creates a delay profile (for example, the delay profile shown in FIG. 4) based on the base band digital signals. The delay profile creation unit 12 updates the delay profile every time the base band digital signal is inputted from the A-D conversion unit.

The path allocation unit 14 separates/extracts paths contained in the multipaths based on the delay profile outputted from the delay profile creation unit 12, and allocates the separated/extracted paths to the finger reception units 16. The path allocation unit 14 sets the priority orders for the paths of an adjacent path group having small propagation time difference separated from the multipaths to eliminate interference between the adjacent paths according to the priority orders, and performs path tracking operations. Further, the path allocation unit 14 assumes each peak of the signal power values in the delay profile as the paths and, among the paths, allocates the path that is assumed to be effective (equal to or more than the threshold value) to each finger reception unit 16. The path allocation unit 14 performs the path tracking operation based on the updated delay profile every time the delay profile creation unit 12 updates the delay profile. That is, the path allocation unit 14 detects whether the peak of signal power value of each path assumed before update is fluctuated or not, and updates allocation of the finger reception unit for the path based on the detection result.

Specifically, the path allocation unit 14 is configured with a grouping unit 22, a judging unit 24, and a path tracking processing unit 26, as shown in FIG. 2.

The grouping unit 22 puts the paths into an independent path and paths of an adjacent path group when separating/extracting each path from the multipaths based on the delay profile, and allocates the finger reception unit 16 to each of the grouped paths. That is, when allocating the finger reception units 16, the grouping unit 22 puts the paths into the independent path and the paths of the adjacent path group by judging whether the propagation time difference of the adjacent paths is within set time or not.

This will be described in a concretive manner. It is assumed here that the created delay profile is the one shown in FIG. 4. The grouping unit 22 calculates propagation delay time difference "Td" between a first path 201 and a succeeding path 202 shown in FIG. 4, and acknowledges the paths with the propagation time difference within the set time (Td<2(Tt+Tm)) as the paths within the adjacent path group, based on the fact that a condition "Td<2(Tt+Tm)" applies or not. The condition "Td<2(Tt+Tm)" will be described. For a path such as the path 201 in FIG. 5, a path tracking region PC is set as a region for tracking a position to be the peak of the signal power value, and mask regions MS are set in side lobes of the path tracking region PC. "2Tt" indicates time length of the path tracking region PC, and "2Tm" indicates time length of the mask regions MS. The grouping unit 22 assumes the position where the signal power value in the delay profile becomes the peak as the position of the path, and performs aforementioned grouping processing based on the assumed result.

In the delay profile shown in FIG. 4, "2(Tt+Tm)<Td" applies for the path 202 with respect to the succeeding path 201. Thus, the grouping unit 22 acknowledges the path 201 as an independent path (single path).

In the delay profile shown in FIG. 4, the paths 202, 203, and 204 have extremely small propagation delay time difference, and are propagated closely. "2(Tt+Tm)>Td" applies for the paths 202, 203, and 204, so that the grouping unit 22 acknowledges the paths 202, 203, and 204 as the paths of the adjacent path group.

The grouping unit 22 separates the paths 202, 203, and 204 contained in the adjacent path group into the individual paths based on the information acknowledged for the paths 202, 203, and 204 in the delay profile shown in FIG. 4.

As a way of example, a following case will be described. In the delay profile shown in FIG. 4, when the grouping unit 22 separates the paths 202, 203, and 204 contained in the adjacent path group into the individual paths, the grouping unit 22 sets the priority orders based on the signal power values of the paths, eliminates the interference between the adjacent paths according to the priority orders, and separates the paths into individual paths.

In the delay profile shown in FIG. 4, among the paths 202, 203, and 204 contained in the adjacent path group, the second path 203 received with propagation delay time with respect to the path 202 has the highest signal power value. The path having the second highest signal power value following the signal power value of the path 203 is the path 204, and the path having the lowest signal power value is the path 202. Thus, the grouping unit 202 separates the paths 202, 203, and 204 contained in the adjacent path group into the individual paths based on the signal power values of the paths (signal power value of the path 203>signal power value of the path 204>signal power value of the path 202).

Through the above-described processing, the grouping unit 22 allocates the path 201 as the independent path and the paths 202, 203, 204 contained in the adjacent path group to the finger reception units 16. When the signal power values of the path 201 as the independent path and the paths 202, 203, 204 contained in the adjacent path group are equal to or less than the threshold value, the grouping unit 22 stops allocations of the paths 201, 202, 203, 204 to the finger reception units 16.

The judging unit 24 receives information from the grouping unit 22, and judges each of the paths 201, 202, 203, and 204 allocated by the grouping unit 22 to find out whether the path 201 is the single path or not, and whether the paths 202, 203, 203 are the paths of the adjacent path group or not. The judging unit 24 outputs the judgment result to the path tracking processing unit 26.

The path tracking processing unit 26 performs path tracking processing for the path 201 as the single and the paths 202, 203, 204 contained in the adjacent path group based on the information outputted from the judging unit 24. It is to be understood that the path 201 is the single path and the paths 202, 203, 204 are the paths contained in the adjacent path group in the information outputted from the judging unit 24.

As shown in FIG. 5, the path tracking processing unit 26 sets the path tracking region PC for the path 201, sets the mask regions MS in the side lobes thereof, and performs path tracking processing for the path 201. Specifically, the path tracking processing unit 26 performs processing to judge whether or not there is time shift generated in the peak position of the signal power value of the path 201 before and after updating, based on the information with which the grouping unit 22 assumes the peak position in the delay profile as the path 201 and the information with which the grouping unit 22 assumes the peak position in the updated delay profile as the path 201. In FIG. 5, the regions with dotted lines in the path 201 are the mask regions MS.

Next, described is a case where the path tracking processing unit 26 performs the path tracking processing for the paths 202, 203, and 204 other than the path 201. As shown in FIG. 5-FIG. 9, the path tracking processing unit 26 sets the priority orders to the paths 202, 203, 204 that are contained in the adjacent path group, sets the path tracking regions PC and the mask regions MS to each of the paths 202, 203, 204 according to the priority orders, and performs the path tracking processing for each of the paths 202, 203, and 204. Specifically, the path tracking processing unit 26 performs the processing to judge whether or not there is time shift generated in the peak positions of the signal power value of the paths 202, 203, and 204 before and after updating, based on the information with which the grouping unit 22 assumes the peak positions in the delay profile as the paths 202, 203, 204, and the information with which the grouping unit 22 assumes the peak positions in the updated delay profile as the paths 202, 203, 204, by a path unit according to the priority orders.

In the delay profile shown in FIG. 4, the path tracking processing unit 26 sets the priority orders in order of the path 203, the path 204, and the path 202, and performs the path tracking processing for the path 203 first, then performs the path tracking processing for the path 204, and performs the path tracking processing for the path 202 at last.

The finger reception unit 16 performs CDMA code demodulation (despread) of the receiving signals for each path according to an instruction from the path allocation unit 14. The rake combine unit 18 performs rake combine of the demodulated signals for each path from each of the finger reception units 16, and outputs the CDMA demodulation signal.

In the explanations above, the CDMA receiver according to the first exemplary embodiment is built as hardware. However, it is not limited only to such case. It may be built as software for allowing a CPU of a computer configuring the CDMA receiver to execute each of the above-described functions of the delay profile unit 12, the path allocation unit 14, the finger reception unit 16, and the rake combine unit 18 based on a control program.

Next, actions of the receiver of a mobile communication system according to the exemplary embodiment will be described by referring to FIG. 3.

For the sake of explanations, it is to be understood that the delay profile creation unit 12 creates the delay profile shown in FIG. 4 based on the inputted base band digital signals, and that the path allocation unit 14 assumes, based on the delay profile shown in FIG. 4, the four points 201, 202, 203, and 204 on the delay profile as the paths having the significant signal powers, and allocates the finger reception units 16 to the assumed paths 201, 202, 203, 204, respectively.

Now, described is a case where, under the above-described state, the delay profile creation unit 12 updates the previous delay profile, extracts each path contained in the multipaths based on the updated delay profile, performs path tracking processing for the extracted paths, and updates the allocation of the finger reception units 16 for the paths to which the path processing is performed.

In FIG. 4, the paths 201, 202, 203, and 204 are assumed as the paths at the positions of the signal power value peaks in the updated delay profile. In FIGS. 4, 201a, 202a, 203a, and 204a are the points assumed as the paths at the positions of the signal power value peaks in the delay profile before being updated. As shown in FIG. 4, unit sampling time Tt for specifying the path tracking region for the path is set on the left and right sides with respect to the peak position of the path signal power value, and the path tracking region is set as sampling time 2Tt. Unit sampling time Tm for specifying the mask region is set on the outer sides of the path tracking region, respectively, and the mask regions are set as sampling time 2Tm. While FIG. 4 shows a case where the path tracking region PC (2Tt) and the mask regions MS (2Tm) are set for the path 201, the paths tracking region (2Tt) and the mask regions MS (2Tm) are also set in the same manner for the paths 202, 203, and 204. In FIG. 4, the propagation delay time difference of the path 202 with respect to the path 201 is propagation delay time Td. The propagation delay time difference Td also exists between the path 202 and the path 203 as well as between the path 203 and the path 204, although the lengths thereof vary.

First, the grouping unit 22 calculates the propagation delay time difference Td between the first path 201 and the succeeding path 202 shown in FIG. 4 (step S1 of FIG. 3).

The grouping unit 22 judges whether or not the condition "Td<2(Tt+Tm)" applies, based on the calculated propagation delay time difference Td (step S2 of FIG. 3).

In the delay profile shown in FIG. 4, "2(Tt+Tm)>Td" applies for the path 202 with respect to the succeeding path 201. The grouping unit 22 acknowledges the path 201 as an independent path (step S2 of FIG. 3; N).

In the delay profile shown in FIG. 4, the path 202, the path 203, and the path 204 have very small propagation delay time differences and are propagated closely, so that "2(Tt+Tm)>Td" does not apply for the paths 202, 203, and 204. Therefore, the grouping unit 22 acknowledges the paths 202, 203, and 204 as the paths of the adjacent path group (step S2 of FIG. 3; Y).

When the above-described processing is not performed for all the adjacent paths (step S5 of FIG. 3; N), the grouping unit 22 shifts the processing to step S1. In the meantime, when the above-described processing is performed for all the adjacent paths (step S5 of FIG. 3; Y), the grouping unit 22 assumes the position of the signal power peak in the updated delay profile as the path 201 based on the information with which it acknowledges the paths 202, 203, and 204 in the updated delay profile shown in FIG. 4. Similarly, the grouping unit 22 assumes the positions of the signal power peaks in the updated delay profile as the paths 202, 203, 204, and puts the adjacent paths 202, 203, 204 into a group as the paths of the adjacent path group.

The grouping unit 22 considers the second path 203 received with propagation delay time with respect to the path 202 as the path having the highest signal power value, considers the path 204 as the path having the second highest signal power value following the signal power value of the path 203, and considers the path 202 as the path having the lowest signal power value. Based on the signal power values of the paths, the grouping unit 22 separates the paths 202, 203, and 204 contained in the adjacent path group into the individual paths.

Through the above-described processing, the grouping unit 22 allocates the finger reception units 16 to the path 201 as the independent path and the paths 202, 203, 204 contained in the adjacent path group.

Next, the judging unit 24 receives the information from the grouping unit 22, and judges whether the path 201 is the independent path or not and whether the paths 202, 203, 204 are the paths of the adjacent path group or not regarding the paths 201, 202, 203, and 204 allocated by the grouping unit 22 (step S6 of FIG. 3). The judging unit 24 outputs the judgment result to the path tracking processing unit 26.

The path tracking processing unit 26 performs the path tracking processing described below separately for a case where the path is the single path (independent path) and for a case where the paths are the paths of the adjacent path group based on the information outputted from the judging unit 24.

When the path 201 is the single path (step S6 of FIG. 3; Y), the path tracking processing unit 26 sets the path tracking region PC for the path 201 and sets the mask regions MS in the side lobes as in FIG. 5, and performs the path tracking processing for the path 201, i.e., performs processing for searching the highest point of the signal power value in the path 201. That is, the path tracking processing unit 26 assumes that the path is fluctuated when there is fluctuation in the peak 201a of the signal power value within the path tracking region PC, and have the path track the peak position of the signal power value (step S7 of FIG. 3). In the case of FIG. 5, the peak of the path 201 is consistent with the peak position of the signal power value. Thus, the path tracking processing unit 26 ends the path tracking processing for the path 201 (step S7 of FIG. 3).

Next, the path tracking processing unit 26 performs the path tracking processing in a manner described below for the paths 202, 203, and 204 that are contained in the adjacent path group, since the adjacent paths 202, 203, and 204 are the paths of the adjacent path group (step S6 of FIG. 3; N).

As shown in FIG. 5-FIG. 9, the path tracking processing unit 26 sets the priority orders of the paths 202, 203, 204 contained in the adjacent path group, sets the path tracking regions PC and the mask regions MS for each of the paths 202, 203, 204 according to the priority orders, and performs the path tracking processing for each of the paths 202, 203, 204, i.e., performs the processing for searching the highest point of the signal power values in each of the paths 202, 203, 204.

That is, as shown in FIG. 4, the path tracking processing unit 26 selects the path 203 that has the highest signal power value (step S8 of FIG. 3). Then, as shown in FIG. 6, the path tracking processing unit 26 sets the path tracking region PC to the path 203, sets the mask regions MS to the side lobes, and performs the path tracking processing for the path 203. As shown in FIG. 6, the peak position of the signal power value within the path tracking region PC is shifted to the right side from the peak 203a. Thus, the path tracking processing unit 26 assumes that the path 203 is fluctuated, and makes the peak of the path 203 follow the peak 203a to the right side thereof as shown in FIG. 7 (step S9 of FIG. 3).

Then, the path tracking processing unit 26 performs the path tracking processing for the remaining paths of the above-described adjacent path group such as each of the paths 203 and 204 shown in FIG. 4 (step S10 of FIG. 3). That is, as shown in FIG. 8, the path tracking processing unit 26 performs the path tracking processing for the path 204 by setting the path tracking region PC and the mask regions MS to the path 204. In FIG. 8, among the waveform of the path 204, the area shown with a solid line is the path tracking region PC, and the areas shown with dotted lines are the mask regions MS. As can be seen from FIG. 8, the peak position of the signal power value within the path tracking region PC is shifted to the right side from the peak 204a. Thus, the path tracking processing unit 26 assumes that the path 204 is fluctuated, and makes the peak of the path 204 follow the peak 204a to the right side thereof as shown in FIG. 8 (step S10 of FIG. 3). In this case, the path tracking region PC and the mask regions MS for the path 203 that is adjacent to the path 204 are not set. Thus, the mask regions in the side lobes of the path 203 and the path 204 do not overlap with each other, i.e., there is no interference occurred.

As shown in FIG. 8, there is time shift in the peak position of the signal power value of the path 204. Thus, the path tracking processing unit 26 performs the path tracking processing as in FIG. 9 (step S10 of FIG. 3).

The path tracking processing unit 26 performs the same processing as that of the path 204 for the path 202 as well (step S10 of FIG. 3).

The path tracking processing unit 26 judges whether or not the processing from step S6 to step S10 is completed for all the allocated paths (step S11 of FIG. 3). When not completed (N in step S11 of FIG. 3), the path tracking processing unit 26 repeatedly executes the processing from step S6 to step S10. Inversely, when the path tracking processing has been completed for all the allocated paths (Y in step S11 of FIG. 3), as shown in FIG. 9, the path tracking processing unit 26 ends a series of processing for the current updating operation of the paths (step S12 of FIG. 3).

After the series of processing (after a prescribed time period), an updating operation of the next path allocation, i.e., searching of new paths and canceling of allocation to the fading paths, is also performed as in the conventional case. The updating operation of the path allocation is not the substance of this exemplary embodiment, so that explanations thereof are omitted.

In the first exemplary embodiment, it is judged to find out whether or not the path tracking regions and the mask regions set for each of the allocated paths overlap with each other before setting the paths tracking regions and the mask regions for the allocated paths. Further, the path tracking region and the mask regions are set preferentially for the path that has the highest signal power among the paths in the overlapping regions, and the path tracking processing is performed. Therefore, it is possible to avoid having a part of the path tracking region of that path to be set within the mask regions that are set for another allocated path. In other words, it is not to be killed by the mask region set for another allocated path. Therefore, it is possible to prevent the path tracking ability to become incapable. This makes it possible to continuously maintain the reception quality.

(Second Exemplary Embodiment)

In the first exemplary embodiment, the priority orders when performing the path tracking operations for the paths of the adjacent path group are set based on the signal power values. However, it is not limited only to such case. The priority orders may be set based on the time orders at which the paths of the adjacent path group are separated/extracted. The same effects as those of the first exemplary embodiment can be obtained also with this structure. Further, for grouping the paths, it is possible to put the paths into a group every time the path tracking processing is performed for a single path or at the point where the path tracking processing for all the assumed multipaths is completed.

(Third Exemplary Embodiment)

In this exemplary embodiment, the priority orders when performing the path tracking operations for the paths set as the adjacent path group may be set based on the orders of allocating the finger reception units to the paths. The same effects as those of the first exemplary embodiment can be obtained also with this structure.

(Fourth Exemplary Embodiment)

In this exemplary embodiment, after the path tracking operation is performed by setting the path tracking region and the mask regions for the most preferential allocated path among the adjacent path group allocated by the path allocation unit, if the mask regions set for the remaining paths do not interfere with each other, the path tracking operations for the allocated paths within the adjacent path group may be executed by setting the path tracking regions and the mask regions for the remaining paths uniformly. With this structure, the path tracking processing for the remaining paths can be executed in parallel, which is advantageous in respect that the path tracking processing can be performed promptly.

(Fifth Exemplary Embodiment)

In this exemplary embodiment, every time the path tracking processing for a single allocated path is completed, it is judged whether or not the allocated paths overlap with each other, and the path tracking processing may be performed based on the judgment result. This structure is advantageous in respect that it is possible to surely prevent interference of the mask regions of the paths that are contained in the adjacent path group.

(Sixth Exemplary Embodiment)

In this exemplary embodiment, the path tracking processing according to the priority orders may be performed as follows. That is, the path tracking region may be set for the highest priority path for performing the path tracking operation, the mask regions may be set for the highest priority path when the tracking operation is completed, and the path tracking operation may be performed for the paths after the highest priority path by setting the path tracking region and the mask regions successively.

Industrial Applicability

The present invention can be applied not only to the CDMA receiver but also to receivers of other forms which receive multipath multiplexed signals other than spread spectrum signals received via a plurality of propagation paths in a spread spectrum mode.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This applications is based upon and claims the benefit of priority from Japanese patent applications No.2006-053582, filed on Feb. 28, 2006, the disclosure of which is incorporated herein in its entirety by reference.

REFERENCE NUMERALS

Figure 1:
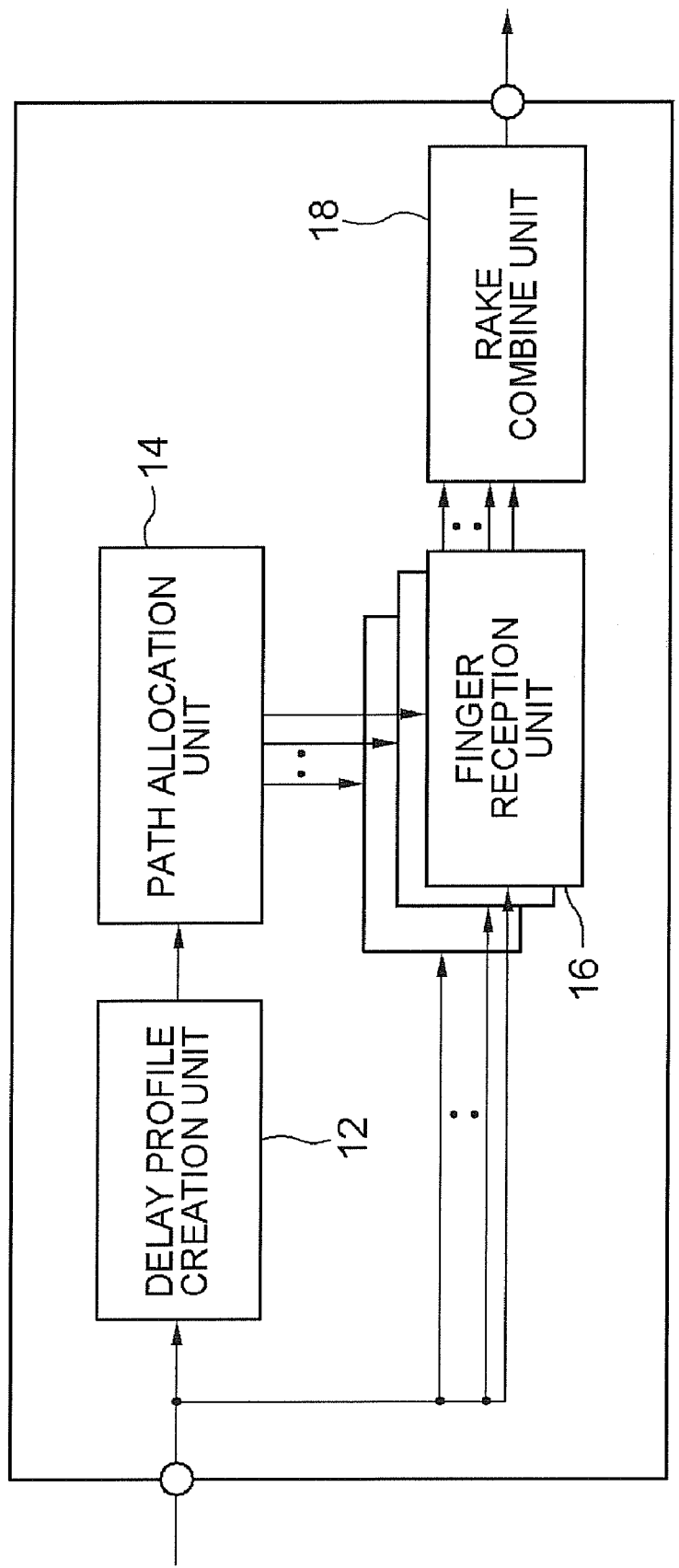
FIG. 1 is a block diagram showing an electrical structure of a CDMA receiver according to a first exemplary embodiment of the invention.
Figure 2:
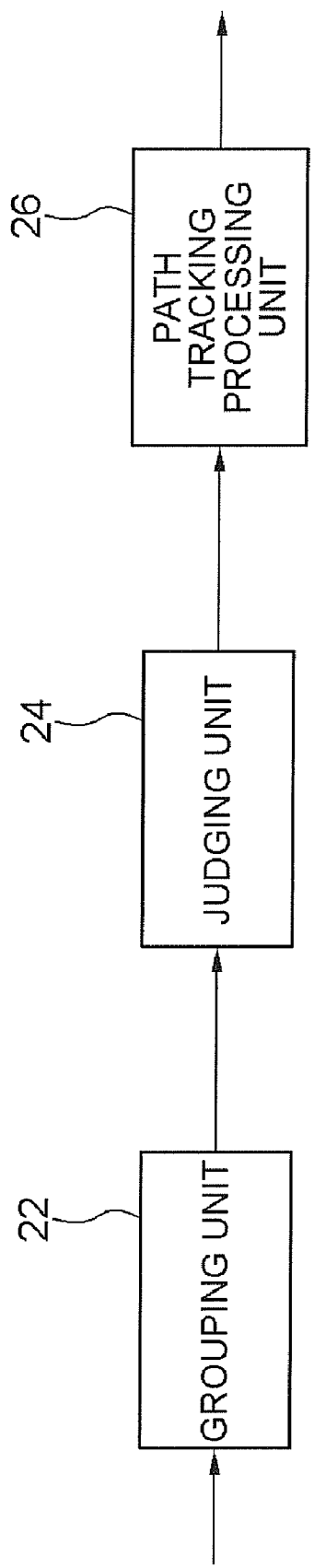
FIG. 2 is a block diagram showing a specific structure of a path allocation unit of the CDMA receiver according to the first exemplary embodiment of the invention.
Figure 3:
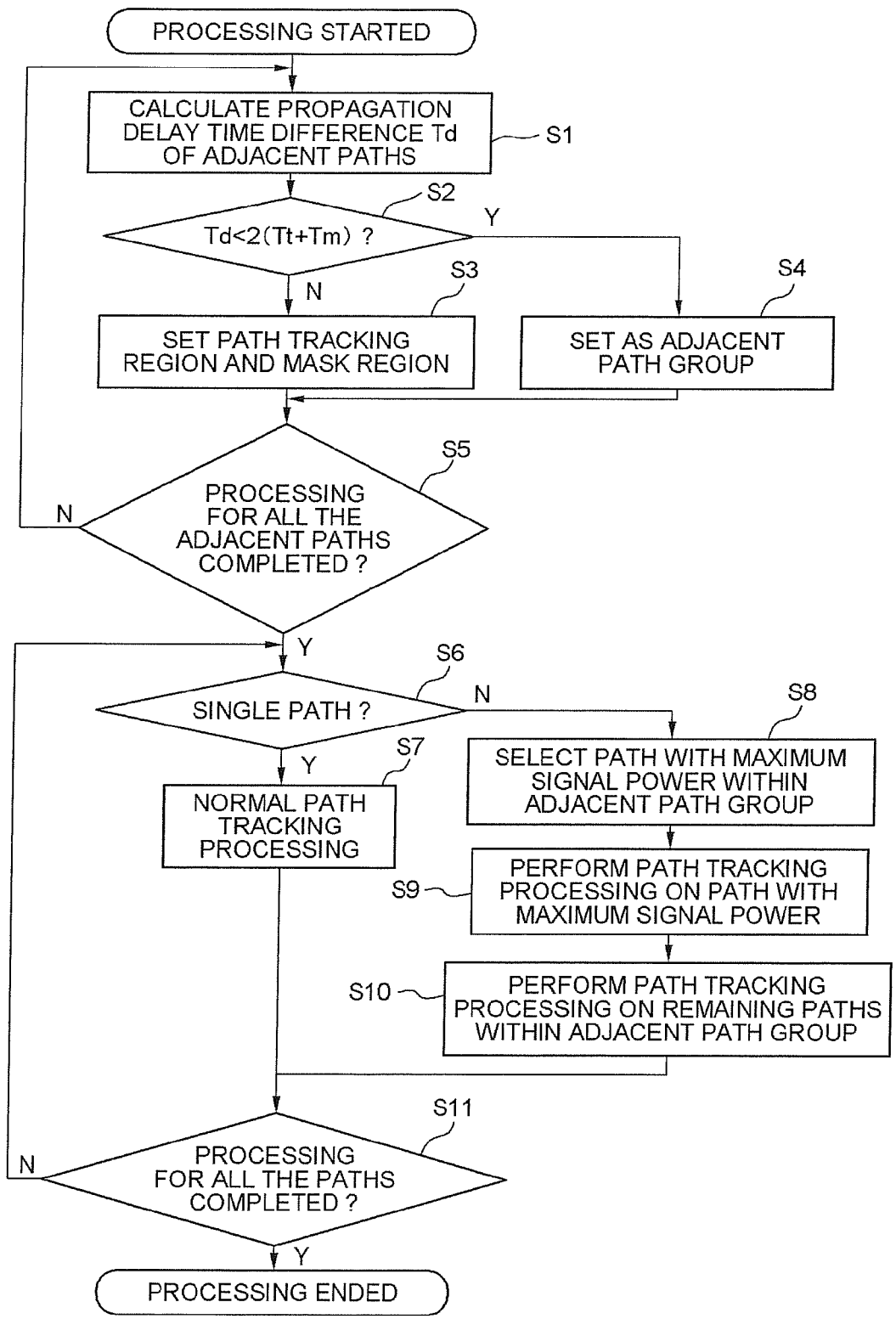
FIG. 3 is a flowchart for describing actions of the path allocation unit of the CDMA receiver according to the first exemplary embodiment of the invention.
Figure 4:
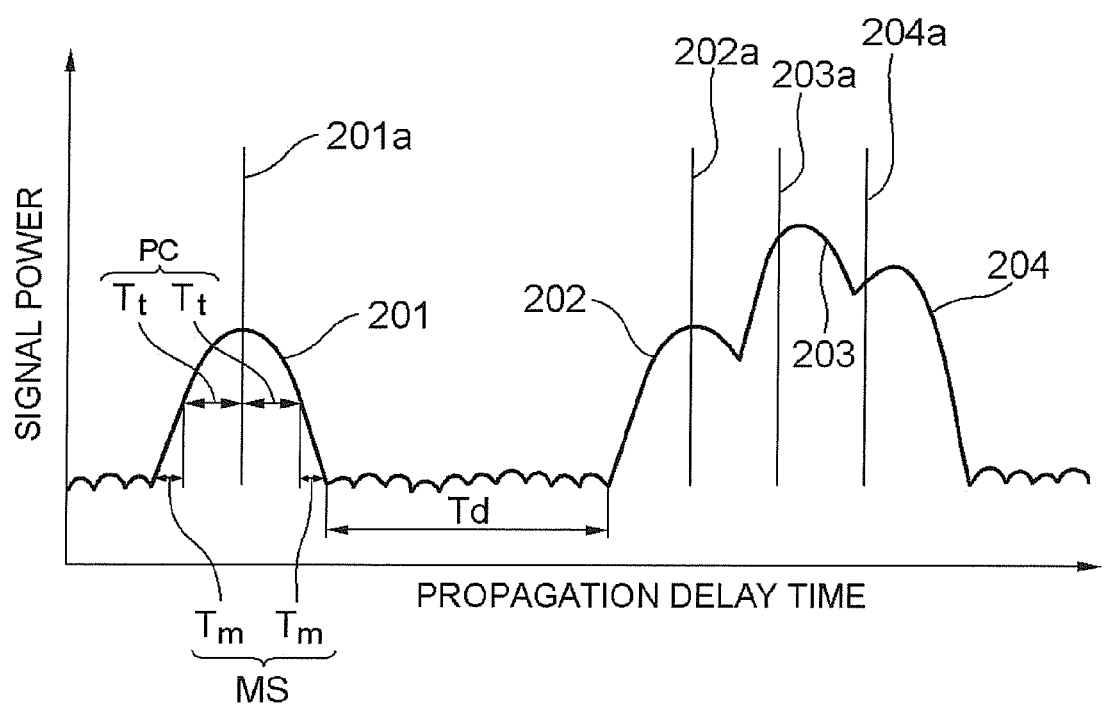
FIG. 4 is an illustration showing an example of paths allocated by the path allocation unit of the CDMA receiver according to the first exemplary embodiment of the invention.
Figure 5:
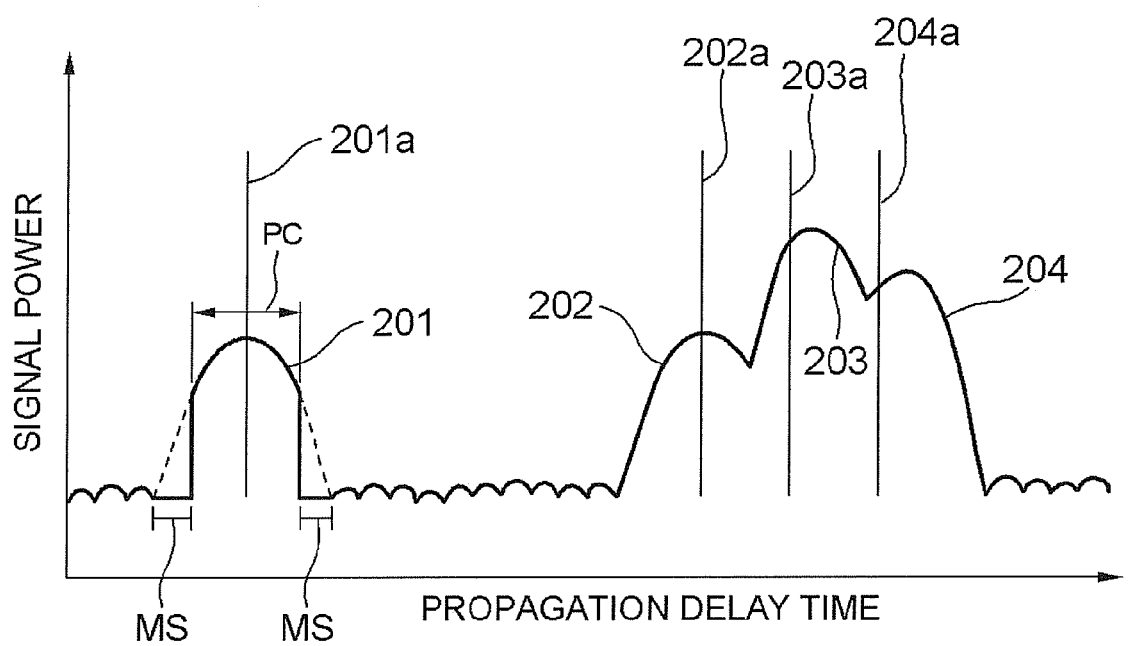
FIG. 5 is an illustration showing a setting example of path tracking regions and mask regions set by the path allocation unit of the CDMA receiver according to the first exemplary embodiment of the invention.
Figure 6:
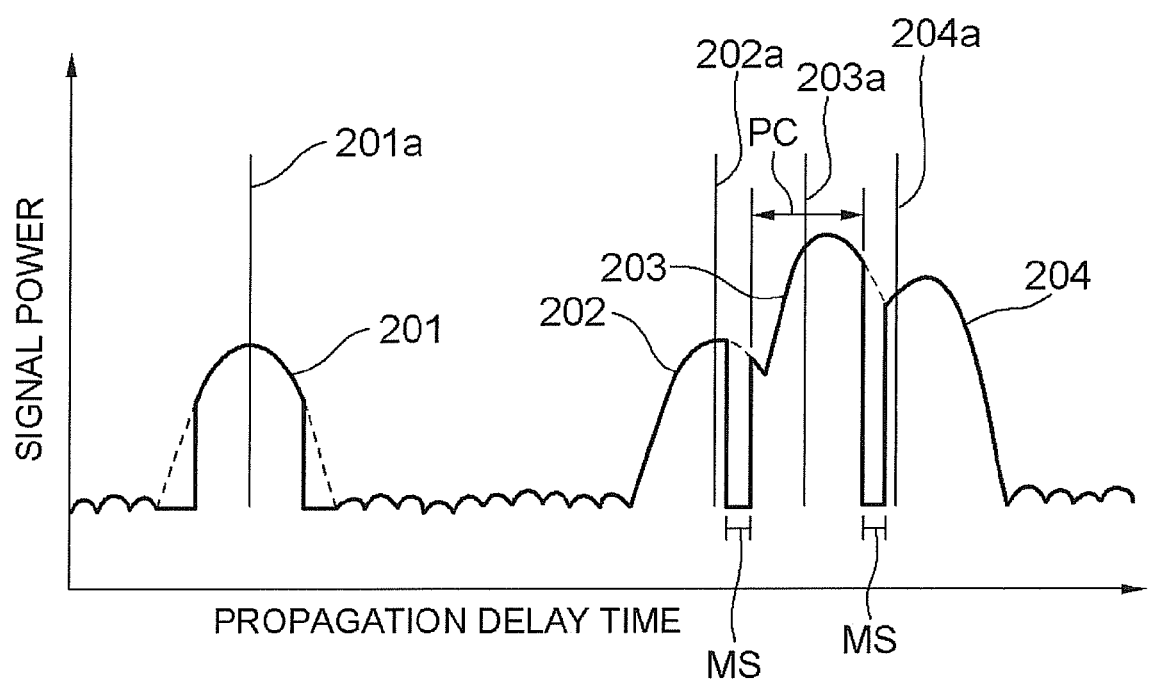
FIG. 6 is an illustration showing a setting example of path tracking regions and mask regions set by the path allocation unit of the CDMA receiver according to the first exemplary embodiment of the invention for an allocated path that has the maximum signal power.
Figure 7:
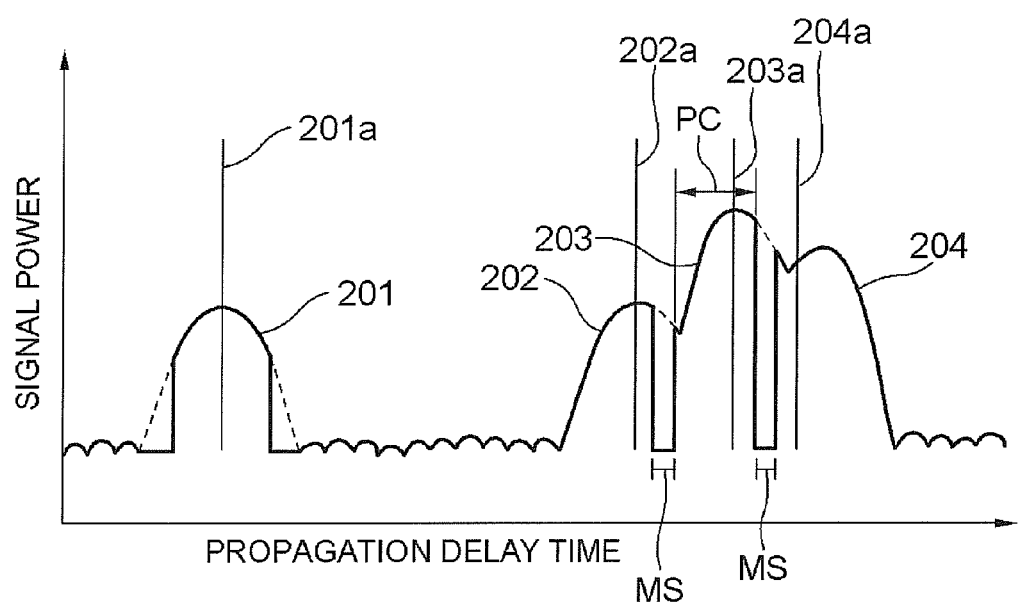
FIG. 7 is an illustration showing an example of a state after completing a path tracking operation performed by the path allocation unit of the CDMA receiver according to the first exemplary embodiment of the invention.
Figure 8:
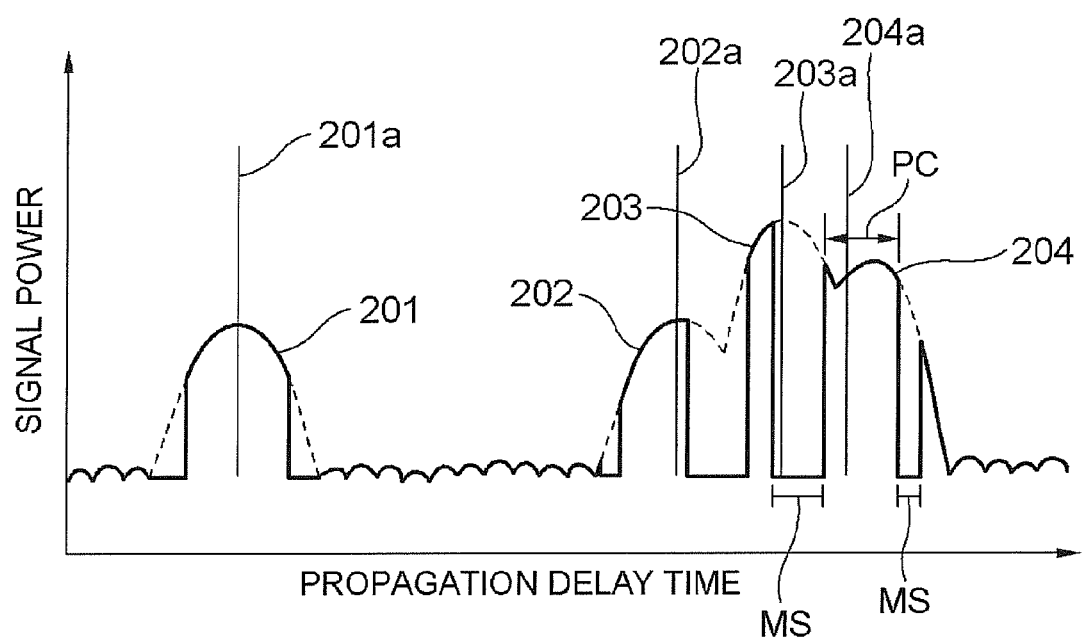
FIG. 8 is an illustration showing an example of mask regions set by the path allocation unit of the CDMA receiver according to the first exemplary embodiment of the invention.
Figure 9:
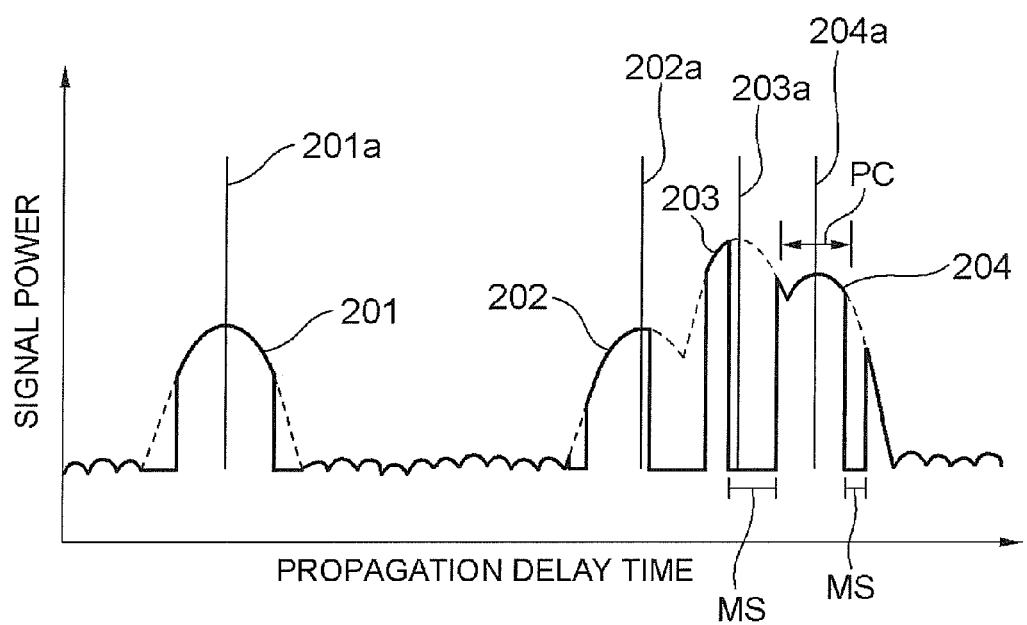
FIG. 9 is an illustration showing another example of the state after completing the path tracking operation performed by the path allocation unit of the CDMA receiver according to the first exemplary embodiment of the invention.
Figure 10:
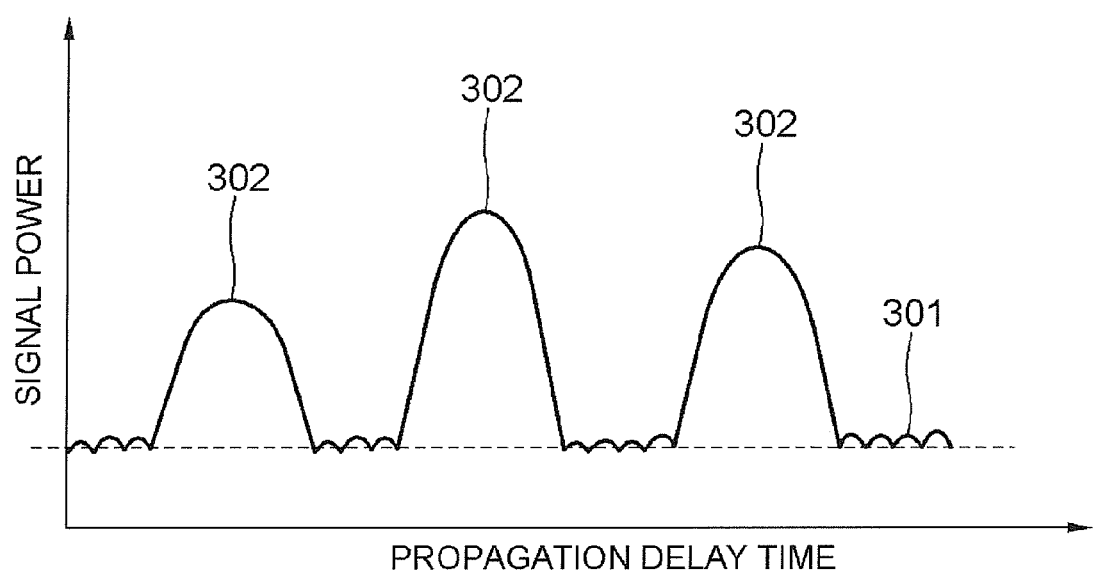
FIG. 10 is an illustration showing an example of a delay profile created by a conventional CDMA-mode receiver.
Figure 11:
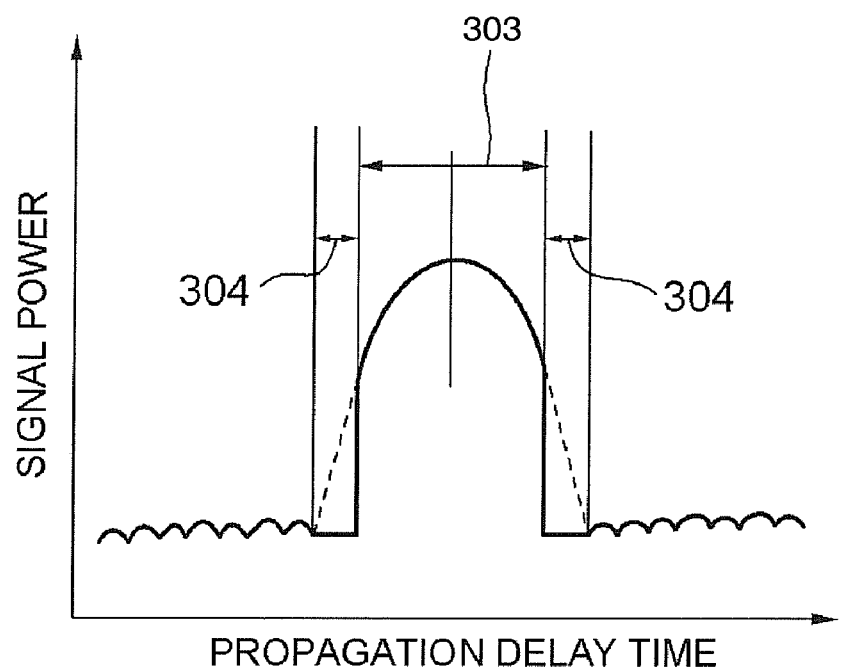
FIG. 11 is an illustration showing a path tracking regions and mask regions set for the paths in a delay profile with a conventional technique.
Figure 12:
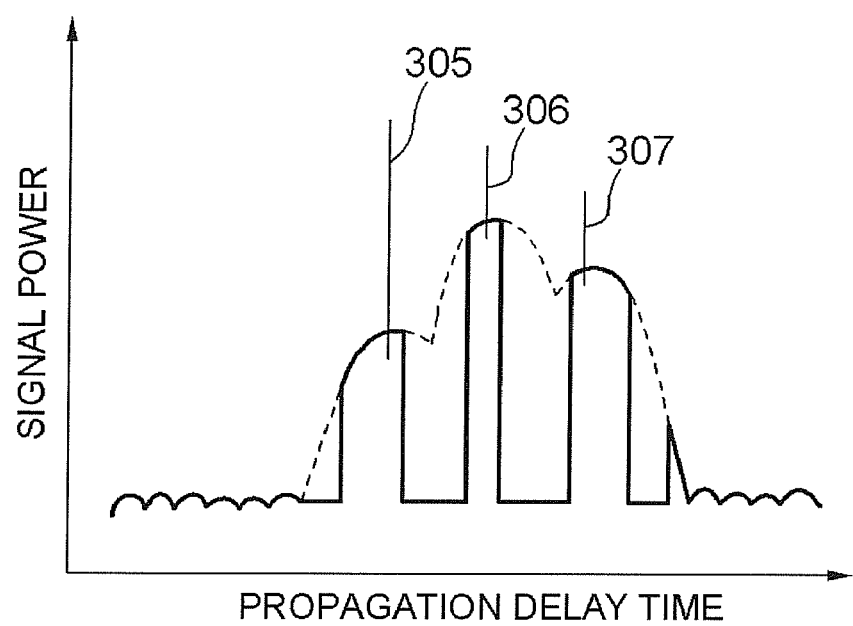
FIG. 12 is an illustration for describing a technical problem that occurs when setting path tracking regions and mask regions for each of a plurality of multipaths in the delay profile with the conventional technique.

1 CDMA receiver
12 Delay profile creation unit
14 Path allocation unit
22 Grouping unit
24 Judging unit
26 Path tracking processing unit

The invention claimed is:

1. A mobile communication system receiver which, based on a delay profile of multipath multiplexed signals to be received, separates/extracts each path contained in multipaths, demodulates received signals by each of the separated paths, and performs rake combine on the demodulated signals, the receiver comprising a path allocation unit for separating/extracting each path contained in the multipaths and allocating the separated/extracted paths to demodulation finger receivers, wherein the path allocation unit comprises:
a grouping unit which puts the paths into an independent path and paths of an adjacent path group when separating/extracting each path from the multipaths based on the delay profile;
a judging unit which judges each of the paths allocated by the grouping unit to find out whether the path is a single path or not, and whether the paths are the paths of the adjacent path group or not; and
a path tracking processing unit which sets priority orders to the paths that are contained in the adjacent path group, sets path tracking regions and mask regions to each of the paths of the adjacent path group according to the priority orders, and executes path tracking processing for each of the paths of the adjacent path group.

2. The mobile communication system receiver as claimed in claim 1, wherein, when propagation delay time difference of the adjacent paths is within set time, the grouping unit acknowledges the paths as the paths of the adjacent path group.

3. The mobile communication system receiver as claimed in claim 2, wherein the grouping unit acknowledges a path as the path of the adjacent path group when "Td<2(Tt+Tm)" applies, provided that a propagation delay time difference of the adjacent paths is "Td", a half of time length of the path tracking region is "Tt", and time length of the mask region is "Tm".

4. The mobile communication system receiver as claimed in claim 1, wherein the path tracking processing unit sets the priority orders based on signal power values of the paths that are contained in the adjacent path group.

5. The mobile communication system receiver as claimed in claim 1, wherein the path tracking processing unit sets the priority orders based on orders of time at which the paths of the adjacent path group are separated/extracted.

6. The mobile communication system receiver as claimed in claim 1, wherein, after the path tracking processing is executed by setting the path tracking region and the mask regions for most preferential allocated path among the adjacent path group, if the mask regions set for remaining paths do not interfere with each other, the path tracking processing unit executes the path tracking processing for the allocated paths within the adjacent path group by setting the path tracking regions and the mask regions for the remaining paths uniformly.

7. The mobile communication system receiver as claimed in claim 1, wherein, every time the path tracking processing for a single allocated path is completed, the path tracking processing unit judges whether or not the allocated paths overlap with each other, and executes the path tracking processing based on a judgment result.

8. The mobile communication system receiver as claimed in claim 1, wherein the path tracking processing unit sets the path tracking region for highest priority path for executing the path tracking processing, sets the mask regions for the highest priority path when the tracking processing is completed, and executes the path tracking processing for the paths after the highest priority path by setting the path tracking region and the mask regions successively.

9. A path tracking method of a mobile communication system using a mobile communication system receiver which, based on a delay profile of multipath multiplexed signals to be received, separates/extracts each path contained in multipaths, demodulates received signals by each of the separated paths, and performs rake combine on the demodulated signals, the method comprising:
putting the paths into an independent path and paths of an adjacent path group when separating/extracting each path from the multipaths based on the delay profile;
judging each of the paths to find out whether the path is a single path or not, and whether the paths are the paths of the adjacent path group or not; and
setting priority orders to the paths that are contained in the adjacent path group, setting path tracking regions and mask regions to each of the paths of the adjacent path group according to the priority orders, and executing path tracking processing for each of the paths of the adjacent path group.

10. The path tracking method of the mobile communication system as claimed in claim 9 further comprising, when propagation delay time difference of the adjacent paths is within set time, acknowledging the paths as the paths of the adjacent path group.

11. The path tracking method of the mobile communication system as claimed in claim 10 further comprising acknowledging a path as the path of the adjacent path group when "Td<2(Tt+Tm)" applies, provided that a propagation delay time difference of the adjacent paths is "Td", a half of time length of the path tracking region is "Tt", and time length of the mask region is "Tm".

12. The path tracking method of the mobile communication system as claimed in claim 9 further comprising setting the priority orders based on signal power values of the paths that are contained in the adjacent path group.

13. The path tracking method of the mobile communication system as claimed in claim 9 further comprising setting the priority orders based on orders of time at which the paths of the adjacent path group are separated/extracted.

14. The path tracking method of the mobile communication system as claimed in claim 9 further comprising, after executing the path tracking processing by setting the path tracking region and the mask regions for most preferential allocated path among the adjacent path group, if the mask regions set for remaining paths do not interfere with each other, executing the path tracking processing for the allocated paths within the adjacent path group by setting the path tracking regions and the mask regions for the remaining paths uniformly.

15. The path tracking method of the mobile communication system as claimed in claim 9, further comprising, every time the path tracking processing for a single allocated path is completed, judging whether or not the allocated paths overlap with each other, and executing the path tracking processing based on a judgment result.

16. The path tracking method of the mobile communication system as claimed in claim 9, further comprising:
setting the path tracking region for highest priority path for executing the path tracking processing, setting the mask regions for the highest priority path when the tracking processing is completed, and executing the path tracking processing for the paths after the highest priority path by setting the path tracking region and the mask regions successively.

17. A non-transitory computer readable recording medium storing a program for allowing a computer that configures a mobile communication system which, based on a delay profile of multipath multiplexed signals to be received, separates/extracts each path contained in multipaths, demodulates received signals by each of the separated paths, and performs rake combine on the demodulated signals, to execute:
a function of putting the paths into an independent path and paths of an adjacent path group when separating/extracting each path from the multipaths based on the delay profile;
a function of judging whether the path is a single path or not, and whether the paths are the paths of the adjacent path group or not; and
a function of setting priority orders to the paths that are contained in the adjacent path group, setting path tracking regions and mask regions to each of the paths of the adjacent path group according to the priority orders, and executing the path tracking processing for each of the paths of the adjacent path group.

18. The non-transitory computer readable recording medium storing the program as claimed in claim 17, which allows the computer to execute a function of, when propagation delay time difference of the adjacent paths is within set time, acknowledging the paths as the paths of the adjacent path group.

19. The non-transitory computer readable recording medium storing the program as claimed in claim 18, which allows the computer to execute a function of acknowledging the paths as the paths of the adjacent path group when "Td<2 (Tt+Tm)" applies, provided that a propagation delay time difference of the adjacent paths is "Td", a half of time length of the path tracking region is "Tt", and time length of the mask region is "Tm".

20. The non-transitory computer readable recording medium storing the program as claimed in claim 17, which allows the computer to execute a function of setting the priority orders based on signal power values of the paths that are contained in the adjacent path group.

21. The non-transitory computer readable recording medium storing the program as claimed in claim 17, which allows the computer to execute a function of setting the priority orders based on orders of time at which the paths of the adjacent path group are separated/extracted.

22. The non-transitory computer readable recording medium storing the program as claimed in claim 17, which allows the computer to execute a function of, after executing the path tracking processing by setting the path tracking region and the mask regions for most preferential allocated path among the adjacent path group, if the mask regions set for remaining paths do not interfere with each other, executing the path tracking processing for the allocated paths within the adjacent path group by setting the path tracking regions and the mask regions for the remaining paths uniformly.

23. The non-transitory computer readable recording medium storing the program as claimed in claim 17, which allows the computer to execute a function of, every time the path tracking processing for a single allocated path is completed, judging whether or not the allocated paths overlap with each other, and executing the path tracking processing based on a judgment result.

24. The non-transitory computer readable recording medium storing the program as claimed in claim 17, which allows the computer to execute a function of setting the path tracking region for highest priority path for executing the path tracking processing, setting the mask regions for the highest priority path when the tracking processing is completed, and executing the path tracking processing for the paths after the highest priority path by setting the path tracking region and the mask regions successively.

25. A mobile communication system receiver which, based on a delay profile of multipath multiplexed signals to be received, separates/extracts each path contained in multipaths, demodulates received signals by each of the separated paths, and performs rake combine on the demodulated signals, the receiver comprising a path allocation means for separating/extracting each path contained in the multipaths and allocating the separated/extracted paths to demodulation finger receivers, wherein the path allocation means comprises:
a grouping means for putting the paths into an independent path and paths of an adjacent path group when separating/extracting each path from the multipaths based on the delay profile;
a judging means for judging each of the paths allocated by the grouping means to find out whether the path is a single path or not, and whether the paths are the paths of the adjacent path group or not; and
a path tracking processing means for setting priority orders to the paths that are contained in the adjacent path group, setting path tracking regions and mask regions to each of the paths of the adjacent path group according to the priority orders, and executing the path tracking processing for each of the paths of the adjacent path group.

* * * * *